United States Patent
McCombs

(10) Patent No.: US 10,502,306 B1
(45) Date of Patent: Dec. 10, 2019

(54) BELLHOUSING ALIGNMENT DEVICE AND METHOD

(71) Applicant: Accel Performance Group LLC, Bowling Green, KY (US)

(72) Inventor: Ross A. McCombs, Oskaloosa, IA (US)

(73) Assignee: Accel Performance Group LLC, Bowling Green, KY (US)

( * ) Notice: Subject to any disclaimer, the term of this patent is extended or adjusted under 35 U.S.C. 154(b) by 161 days.

(21) Appl. No.: 15/495,492

(22) Filed: Apr. 24, 2017

Related U.S. Application Data

(60) Provisional application No. 62/327,046, filed on Apr. 25, 2016.

(51) Int. Cl.
*F16H 57/025* (2012.01)
*F16H 57/02* (2012.01)

(52) U.S. Cl.
CPC . *F16H 57/025* (2013.01); *F16H 2057/02021* (2013.01)

(58) Field of Classification Search
CPC .............. F16H 57/025; F16H 2057/02021
See application file for complete search history.

(56) References Cited

U.S. PATENT DOCUMENTS

| | | |
|---|---|---|
| 157,272 A | 12/1874 | Conger |
| 1,011,000 A | 12/1911 | Worth et al. |
| 1,749,917 A | 3/1930 | Meadowcroft |
| 1,824,440 A | 9/1931 | Meyer |
| 2,062,102 A | 12/1932 | Nutt et al. |
| 2,060,773 A | 1/1933 | Pearmain |
| 1,899,274 A | 2/1933 | Hook et al. |
| 1,939,356 A | 12/1933 | Lindgren |
| 2,091,409 A | 8/1937 | Lewis |
| 2,107,954 A | 2/1938 | Morton et al. |
| 2,126,149 A | 8/1938 | Spase |
| 2,674,216 A | 4/1954 | Griffin |
| 2,746,163 A | 5/1956 | Mortiz |
| 2,752,675 A | 7/1956 | Bauer |
| 2,825,129 A | 3/1958 | Hempel |
| 2,932,890 A | 4/1960 | Sporck et al. |
| 2,982,150 A | 5/1961 | Kolbe |
| 3,027,960 A | 4/1962 | Ditel |
| 3,072,086 A | 1/1963 | Birchfield et al. |
| 3,075,691 A | 1/1963 | Kelley |

(Continued)

FOREIGN PATENT DOCUMENTS

| | | |
|---|---|---|
| DE | 202015009048 | 9/2016 |
| WO | 2015066500 | 7/2015 |

OTHER PUBLICATIONS

Quicktime Inc. Product Listing Dec. 1, 2005 [online] www.quicktimeinc.com/products.html [retrieved on May 10, 2011], Retrieved from Internet Archive http://replay.web.archive.org.

(Continued)

*Primary Examiner* — Vicky A Johnson
(74) *Attorney, Agent, or Firm* — Middleton Reutlinger

(57) ABSTRACT

The present invention is a device and method for aligning a bellhousing without a centered opening at the transmission mounting surface to an engine block. The device and method of using the device permit the alignment of the bellhousing to be performed without requiring the user remove a portion of the transmission for use in the alignment process.

16 Claims, 8 Drawing Sheets

(56) References Cited

U.S. PATENT DOCUMENTS

| | | | |
|---|---|---|---|
| 3,090,475 A | 5/1963 | Gatewood et al. | |
| 3,104,640 A | 9/1963 | Sporck et al. | |
| 3,114,342 A | 12/1963 | Sporck et al. | |
| 3,187,534 A | 6/1965 | Serope | |
| 3,205,688 A | 9/1965 | Paulton | |
| 3,222,765 A | 12/1965 | Parent et al. | |
| 3,316,745 A | 5/1967 | Berghahn et al. | |
| 3,342,051 A | 9/1967 | Leszak | |
| 3,355,920 A | 12/1967 | Ellenburg | |
| 3,391,439 A | 7/1968 | Bulgrin | |
| 3,603,435 A | 9/1971 | Buzzard | |
| 3,667,581 A | 6/1972 | Hanks | |
| 3,696,689 A * | 10/1972 | Senter | F16H 57/025 180/271 |
| 3,772,938 A * | 11/1973 | Johnson | F02F 7/0073 123/195 A |
| 3,809,192 A | 5/1974 | Stehle | |
| 3,841,290 A * | 10/1974 | Schubeck | F02F 7/0073 123/195 A |
| 4,016,642 A | 4/1977 | Kraft et al. | |
| 4,041,746 A | 8/1977 | Kraft | |
| 4,050,321 A | 9/1977 | Kraft | |
| 4,055,976 A | 11/1977 | Kraft | |
| 4,056,291 A | 11/1977 | Kraft et al. | |
| 4,109,542 A | 8/1978 | Kraft | |
| 4,254,541 A | 3/1981 | St. John | |
| 4,289,008 A | 9/1981 | Steele | |
| 4,294,343 A | 10/1981 | Reh | |
| 4,478,593 A | 10/1984 | Brown | |
| 4,528,734 A | 7/1985 | Beyer | |
| 4,579,604 A | 4/1986 | Beyer | |
| 4,580,673 A | 4/1986 | Graton | |
| 4,599,769 A | 7/1986 | Latzko et al. | |
| 4,606,206 A | 8/1986 | Daudi | |
| 4,641,547 A | 2/1987 | Stich et al. | |
| 4,674,616 A | 6/1987 | Mannino, Jr. | |
| 4,747,284 A | 5/1988 | Hudson | |
| 603,094 A | 4/1989 | Worth | |
| 4,848,080 A | 7/1989 | Hoffmann et al. | |
| 4,936,129 A | 6/1990 | Lipper et al. | |
| 4,955,343 A | 9/1990 | Ogami | |
| 4,989,657 A | 2/1991 | Lipper | |
| 5,094,331 A | 3/1992 | Fujimoto et al. | |
| 5,150,777 A | 9/1992 | Friedmann | |
| 5,184,524 A * | 2/1993 | Senia | B60K 17/00 74/609 |
| 5,203,441 A | 4/1993 | Monette | |
| 5,218,849 A | 6/1993 | Sieger et al. | |
| 5,226,516 A | 7/1993 | Novikoff et al. | |
| 5,267,488 A | 12/1993 | Hardeman et al. | |
| 5,279,182 A | 1/1994 | Fukushima | |
| 5,351,796 A | 10/1994 | Uenohara | |
| 5,384,949 A | 1/1995 | Wodrich et al. | |
| 5,404,979 A | 4/1995 | Craft et al. | |
| 5,426,964 A | 6/1995 | Sieger | |
| 5,473,808 A | 12/1995 | Winters, Sr. | |
| 5,531,088 A | 7/1996 | Inatani | |
| 5,566,591 A | 10/1996 | Burkett | |
| 5,575,367 A | 11/1996 | Romanelli | |
| 5,619,879 A | 4/1997 | Friese | |
| 5,634,271 A | 6/1997 | Lipper | |
| 5,758,532 A | 6/1998 | Massee | |
| 5,775,151 A | 7/1998 | Massee | |
| 5,782,324 A | 7/1998 | Wall | |
| 5,836,431 A | 11/1998 | Jackel | |
| 5,845,757 A | 12/1998 | Csonka | |
| 5,857,547 A | 1/1999 | Dequesnes | |
| 5,896,971 A | 4/1999 | Hein | |
| 6,042,935 A | 3/2000 | Krenkel et al. | |
| 6,056,099 A | 5/2000 | Jacket et al. | |
| 6,065,578 A | 5/2000 | Nakatani et al. | |
| 6,189,357 B1 | 2/2001 | Baumgarten et al. | |
| 6,199,419 B1 | 3/2001 | Shrayer et al. | |
| 6,561,002 B2 | 5/2003 | Okada et al. | |
| 6,568,518 B2 | 5/2003 | Sarar | |
| 6,601,284 B1 | 8/2003 | Wall | |
| 6,694,791 B1 | 2/2004 | Johnson et al. | |
| 6,701,617 B2 | 3/2004 | Li et al. | |
| 6,705,263 B2 | 3/2004 | Ito et al. | |
| 6,731,043 B2 | 5/2004 | Pritchard et al. | |
| 6,823,705 B2 | 11/2004 | Fukuda et al. | |
| 7,091,635 B2 | 8/2006 | Gilliland et al. | |
| 7,097,006 B2 | 8/2006 | Veneziano | |
| 7,097,007 B2 | 8/2006 | Lin | |
| 7,124,609 B1 | 10/2006 | Hermanson | |
| 7,152,446 B2 | 12/2006 | Wada et al. | |
| 7,228,629 B2 | 6/2007 | Beyer | |
| 7,243,517 B2 | 7/2007 | Sieger | |
| 7,798,301 B2 | 9/2010 | Keating et al. | |
| 8,146,719 B2 | 4/2012 | Antanaitis et al. | |
| 8,353,638 B2 * | 1/2013 | Arnott | B23P 19/10 403/3 |
| 8,561,283 B1 | 10/2013 | McCombs et al. | |
| D726,531 S | 4/2015 | Muzic | |
| 9,360,100 B2 | 6/2016 | McCombs et al. | |
| D760,582 S | 7/2016 | Muzic | |
| 9,482,308 B2 | 11/2016 | McCombs | |
| 9,518,645 B2 | 12/2016 | McCombs | |
| 9,739,343 B2 | 8/2017 | McCombs | |
| 2003/0005792 A1 | 1/2003 | Ninomiya et al. | |
| 2003/0015058 A1 | 1/2003 | Bell | |
| 2003/0145676 A1 | 8/2003 | Bennefous et al. | |
| 2004/0040802 A1 | 3/2004 | Veneziano et al. | |
| 2005/0010328 A1 | 1/2005 | Ikeda et al. | |
| 2006/0090591 A1 | 5/2006 | Graeve | |
| 2006/0231369 A1 | 10/2006 | Bassett et al. | |
| 2006/0272378 A1 | 12/2006 | Amino et al. | |
| 2007/0039366 A1 | 2/2007 | Michel et al. | |
| 2008/0179870 A1 | 7/2008 | Theodore | |
| 2009/0301153 A1 | 12/2009 | Tachi | |
| 2010/0116603 A1 | 5/2010 | Kitchell | |
| 2012/0186386 A1 | 7/2012 | McCombs | |
| 2012/0186935 A1 | 7/2012 | McCombs | |
| 2012/0186936 A1 | 7/2012 | McCombs | |
| 2014/0020505 A1 | 1/2014 | McCombs et al. | |
| 2015/0122066 A1 | 5/2015 | McCombs | |
| 2015/0300420 A1 | 10/2015 | Kirchhoffer | |
| 2015/0377304 A1 | 12/2015 | McCombs | |
| 2016/0069416 A1 | 3/2016 | Kowalski | |
| 2016/0281835 A1 | 9/2016 | McCombs et al. | |
| 2017/0045115 A1 | 2/2017 | McCombs | |
| 2017/0234402 A1 | 8/2017 | McCombs | |

OTHER PUBLICATIONS

SFI Foundation Inc., "Specification List", www.sfifoundation.com/speclist.html. Printout from Internet Oct. 26, 2007.

Speedway Motors, Explosion-Proof Chevy Bellhousing With Plate; www.speedwaymotors.com/p/545,37, Printout from Internet Oct. 25, 2007.

Definition of "Bell housing", wikipedia page printout from Internet Oct. 28, 2007.

"List of Chrysler bellhousing patterns", wikipedia page printout from Internet Oct. 28, 2007.

Definition of "Hydroforming", wikipedia page printout from Internet Oct. 28, 2007.

Definition of "Metal spinning", wikipedia page printout from Internet Oct. 28, 2007.

Engineers Edge, "Metal Spinning", diagram illustrating "outside" type metal spinning, page printout from Internet Oct. 28, 2007.

Globalspec, "About Metal Spinning Services" examples of metal spinning, page printout from Internet Oct. 28, 2007.

Utility U.S. Appl. No. 15/495,492 entitled Bellhousing Alignment Device and Method filed Apr. 24, 2017.

Belway B.P. et al. (2006). ASM Handbook, vol. 14B—Metalworking: Sheet Forming . . . ASM International. pp. 367-374.

Tremec Corporation T-56; Tremec Transmissions 2012 Performance Product Guide Mar. 24, 2015. Retrieved from www.archive.org Nov. 2, 2017.

* cited by examiner

BELLHOUSING ALIGNMENT DEVICE AND METHOD

CROSS-REFERENCE TO RELATED APPLICATION

This non-provisional patent application claims priority to and benefit of, under 35 U.S.C. § 119(e), U.S. Provisional Patent Application Ser. No. 62/327,046, filed Apr. 25, 2016 and titled "Bellhousing Alignment Device and Method", all of which is incorporated by reference herein.

TECHNICAL FIELD

Exemplary embodiments relate generally to, and without limitation, a device, a method and system for aligning the transmission mounting surface of a bellhousing to an engine crankshaft in order to minimize misalignment between the engine crankshaft and a transmission input shaft.

BACKGROUND AND SUMMARY OF THE INVENTION

Engines used in automotive and other applications may be mounted to a transmission using an adapter between the engine and transmission that provides both a means to connect the dissimilar mounting surfaces of the engine and transmission and also a space to enclose a clutch or similar coupling device to transfer the rotational movement from the engine crankshaft to the transmission. An engine typically has a crankshaft that extends longitudinally through the engine with a mounting surface located at the rear of the engine to which a flywheel, flex plate, or similar torque transfer mounting surface is affixed. The crankshaft has a rotational center (axis of rotation) which is determined by the characteristics of the crankshaft and the engine bearings within which the crankshaft rotates. The description herein may make references to a clutch, a flywheel, and a transmission. One ordinarily skilled in the art will appreciate that the embodiments are also applicable to engine/transmission combinations that utilize automatic transmissions with torque converter devices and flex plates and also embodiments in which the engine crankshaft is connected directly to the transmission rather than through the use of clutches and flywheels as discussed herein.

A transmission generally comprises an input shaft which is placed in rotational communication with a clutch/flywheel assembly affixed to the crankshaft of the engine. Failure to align the rotational axis of the crankshaft with the rotational axis of the transmission input shaft can cause damage to the bearings located at the transmission input shaft and at other locations in the transmission. The more severe the misalignment, the greater the potential damage to the transmission and corresponding reduction in service life. Therefore, minimizing the amount of such misalignment is critical when mounting a transmission to an engine. As was noted above, the interface between the engine and the transmission may be bellhousing. Many bellhousings have a circular opening formed in the transmission mounting surface through which the transmission input shaft is passed when the transmission is installed on the bellhousing. In many such bellhousings, these circular openings are formed such that their center points are oriented a known distance from transmission locating dowels. These dowels serve to align the shaft of the transmission with the center point of the opening. In order to align the bellhousing opening with the crankshaft of the engine and thus the transmission input shaft with the crankshaft, a measurement fixture may be attached to the crankshaft and used to alight the bellhousing opening. This fixture may comprise a shaft extending from the crankshaft to which a measurement device such as a dial indicator is mounted. The measurement device is used to indicate changes in alignment as the crankshaft is rotated. If the bellhousing is misaligned, the measurement may be greater at one point of rotation then at another. A user may adjust the mounting of the bellhousing to minimize the variation of the measurement as the crankshaft is rotated through 360 degrees. Other alignment fixtures may rely on a disc structure that is affixed to the crankshaft which occupies the bellhousing opening to indicate that the opening is aligned with regard to the crankshaft. Certain bellhousing configurations, in order to properly interface with certain types of transmissions, do not have a circular opening as previously described. An example of such a transmission is a Tremec T56 ("T56") transmission. In this particular transmission style, the bellhousing mounting opening is required to be roughly a large circle in shape but also includes several irregular portions. The result is that the inner surface of the transmission mounting surface of a bellhousing intended for this type of transmission will not have a circular shape usable by the alignment measurement fixture previously described, but instead may have an irregular, non-circular, non-concentric or overly large opening which is not suitable for use with an alignment tool. As a result, someone attempting to mount a T56 transmission may be required to disassemble the transmission in order to use a front panel portion of the transmission case to create the round opening needed for proper alignment of the crankshaft and transmission input shaft. As a result, having to disassemble the transmission in order to utilize the transmission front panel creates a great deal of additional work for someone wishing to perform the alignment of the engine and transmission.

What is needed is a device for facilitating the alignment of an engine crankshaft and transmission input shaft when the bellhousing opening is such that a conventional alignment fixture will not perform correctly. In an embodiment of the invention, an alignment plate is created such that the alignment plate provides a circular opening positioned at a precise distance from transmission locating pins located in the bellhousing. This alignment plate permits a user of the plate to align a bellhousing using standard alignment fixtures without the need to provide a transmission housing portion to perform the alignment as described above.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the claims. In addition, descriptions of well-known functions and constructions are omitted for clarity and conciseness.

Figure 1:
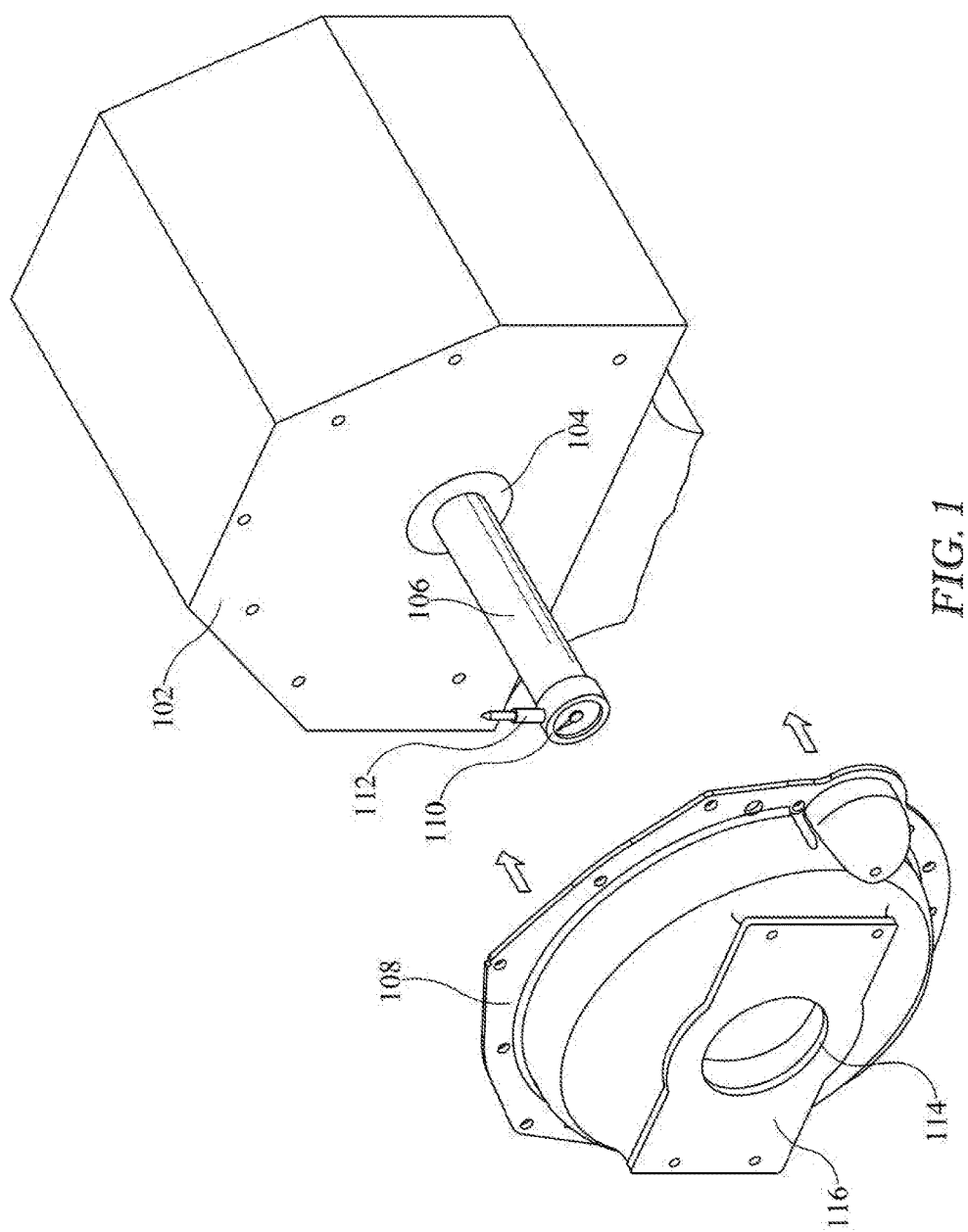
FIG. 1 is an illustration of an engine block, a standard bellhousing, and a bellhousing alignment fixture mounted to the crankshaft of the engine.

An engine and transmission of an automobile are generally mated together using a bellhousing. The bellhousing serves not only to adapt the engine mounting surfaces to the transmission, but also to contain a clutch assembly or torque converter depending upon the type of transmission used. The following discussion is applicable to configurations using either torque converters or clutches. However, for the sake of simplicity, the description that follows will describe an embodiment with a clutch. When an engine is assembled to a transmission using a bellhousing, the axis of rotation of the crankshaft of the engine and also the transmission input shaft must be aligned. Failure to align these shafts may result in excessive stress being applied to the bearings of the engine and transmission. This is particularly critical with regard to the input shaft bearing of the transmission. Excessive stress may result in performance loss as well as a shortened life of the transmission bearings. Aligning these shafts is generally performed by aligning the transmission mounting surface of the bellhousing with that of the crankshaft axis of rotation. In order to facilitate this alignment, the transmission mounting surface of the bellhousing may comprise a circular opening. This circular opening may be configured such that its center corresponds to the axis of rotation of the transmission input shaft. A typical engine block 102 is illustrated schematically in FIG. 1. Also shown is a portion of the crankshaft 104, an alignment tool 106 and a bellhousing 108. In known methods of aligning the bellhousing, an alignment tool 106 is mounted to the end of the crankshaft 104. As is shown, an embodiment of the alignment tool 106 may further comprise a dial indicator 110 with a probe or plunger 112 that protrudes radially from the axis of rotation of the crankshaft. The bellhousing 108 is installed to the engine block 102. With the bellhousing installed, the probe 112 of the dial indicator 110 may be positioned such that it makes contact with the edge of the circular hole 114 located in the transmission mounting plate 116. The crankshaft 104 may then be rotated such that the dial indicator measures the distance from the alignment tool 106 to the edge of the circular hole 114 or for example a bearing therein. The bellhousing may then be adjusted with regard to the engine block until the dial indicator indicates that the measurement between the tool and the circular hole remains predominantly unchanged as the crankshaft is rotated about 360-degrees of rotation. This predominantly unchanged measurement indicates that the circular hole is centered within a certain amount of error with regard to the crankshaft axis of rotation. This method is well known and with care, can produce an alignment sufficient to avoid excessive stress being applied to the transmission input shaft bearings.

Figure 2:
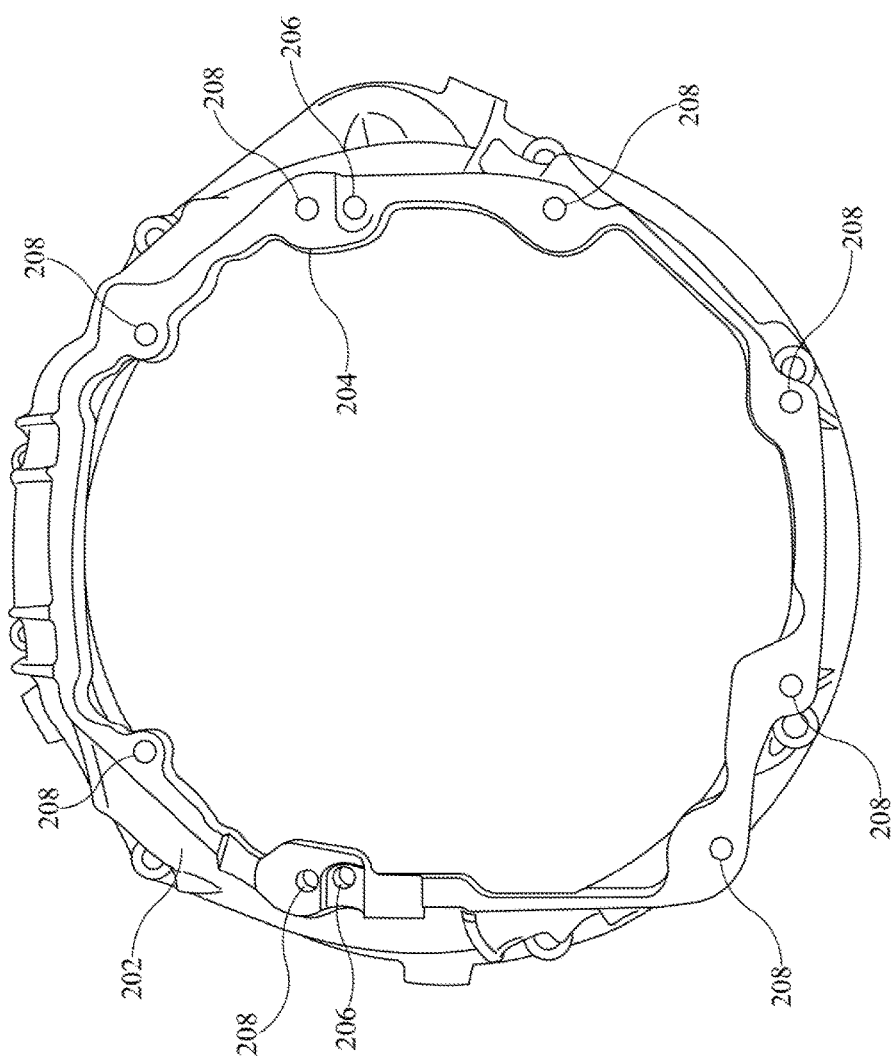
FIG. 2 is an illustration of an embodiment of a bellhousing used to mount a T56 transmission to an engine.
Figure 3:
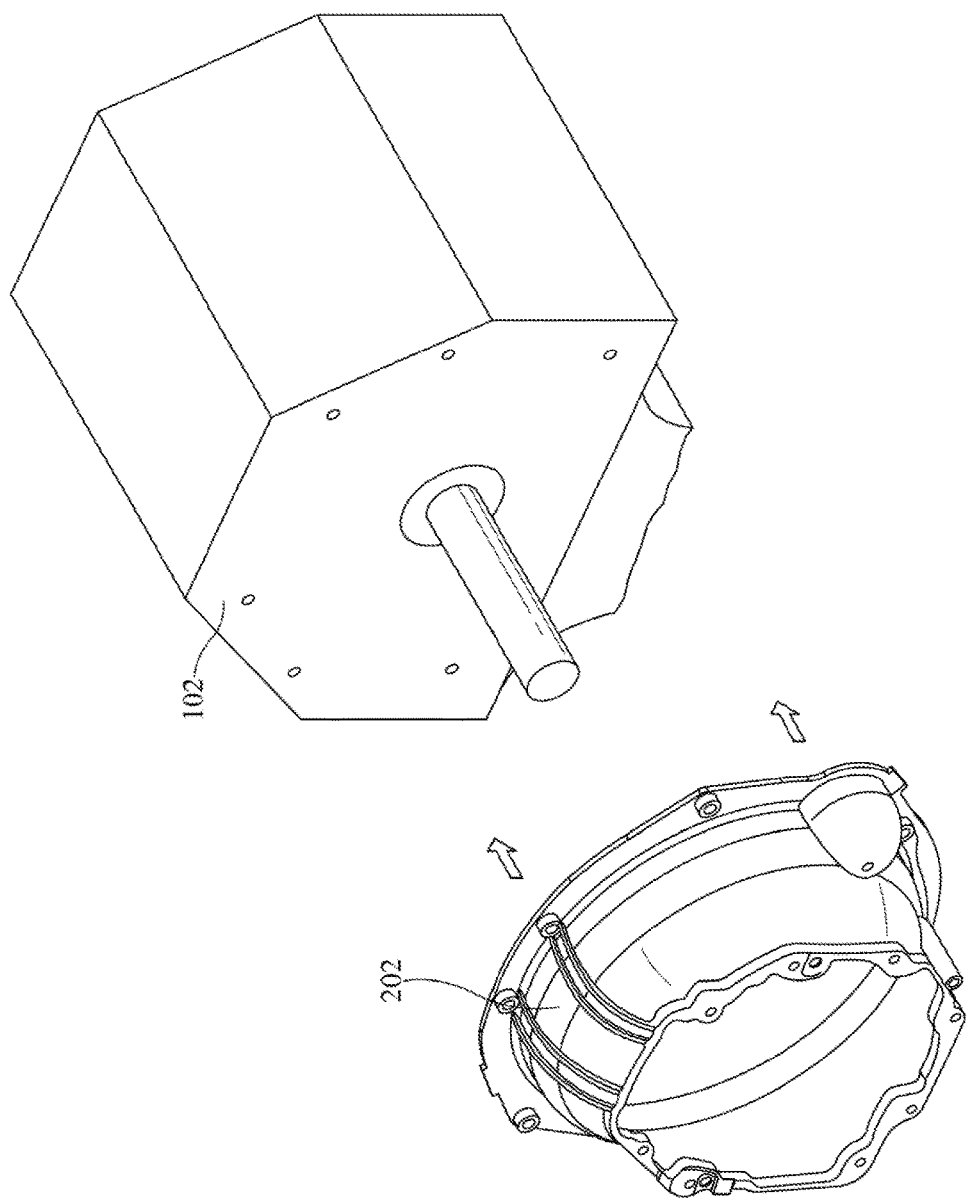
FIG. 3 is an illustration of the bellhousing of FIG. 2 about to be mounted to an engine block.

Unfortunately, due to the mounting requirements of certain transmissions, the bellhousing transmission mounting plate 116 may not be configured to have a circular opening or that opening may be positioned such that its center does not correspond to the axis of rotation of the transmission input shaft. As illustrated in FIG. 2, a bellhousing 202, having a plurality of mounting holes 208, may be configured such that the opening 204 is larger than can be accommodated by the alignment tool 106. Additionally, as can be observed, the opening 204 in the illustrated bellhousing is not only large but also irregularly shaped. Any of various problems may lead to a need to use the instant method and structure. The bellhousing 202 may have an opening 204 which may be any of large, irregularly shaped, asymmetric, non-centered, and/or non-concentric relative to an engine shaft or crankshaft 104. As such, the alignment tool 106 and method described above will not function as intended. Known methods of overcoming this difficulty involved mounting the front portion of the transmission housing to the bellhousing and using an input shaft bearing mounting flange as a reference point for the alignment tool. However, as mentioned, it is undesirable to remove portions of the transmission due to the complexity of such task and the possibility of damage to the transmission or components within the housing, if any portion of the transmission housing is removed. For reference, the bellhousing of FIG. 3 is illustrated in relation to an engine block to which it is about to be mounted.

Figure 4:
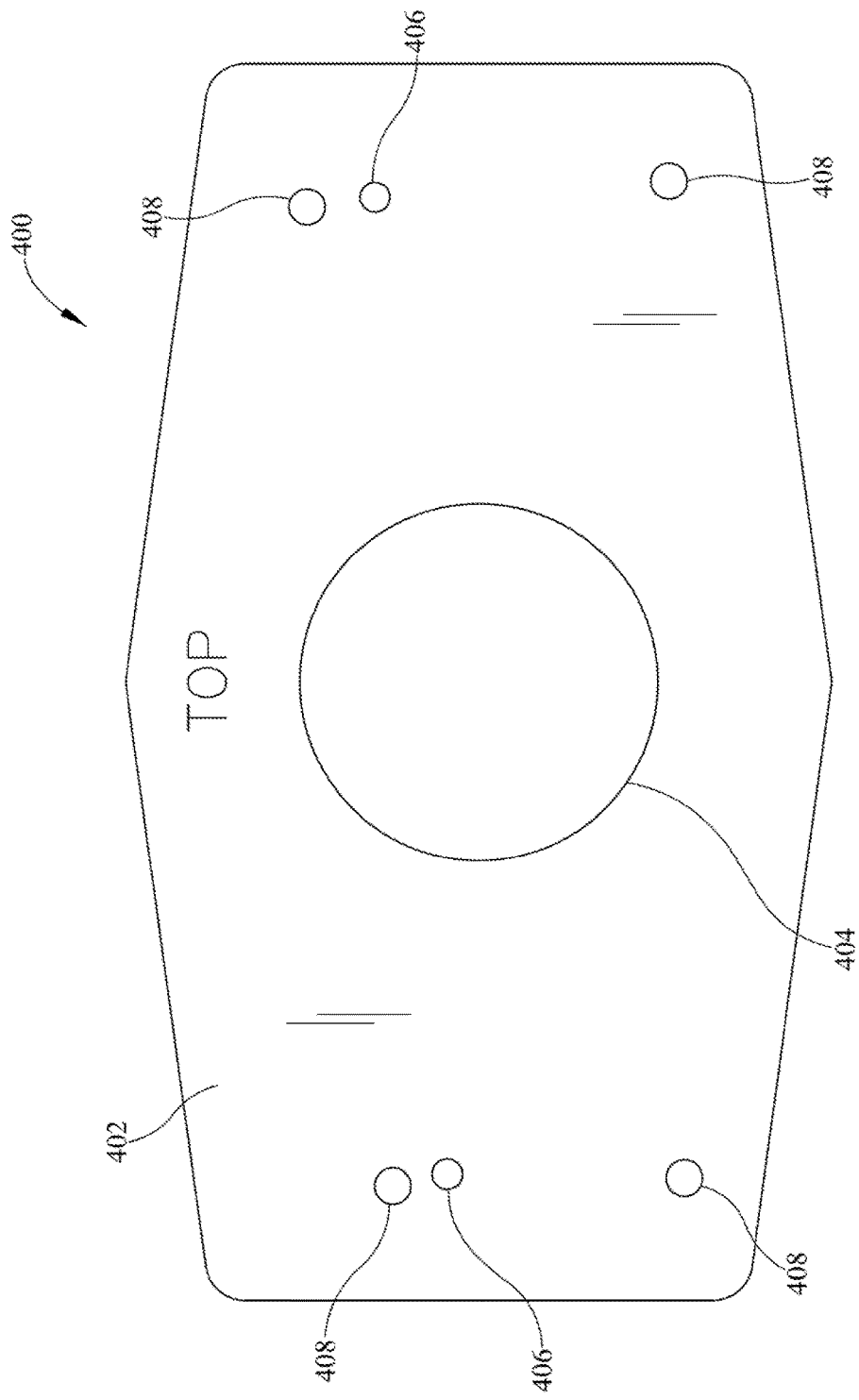
FIG. 4 is an illustration of an embodiment of the inventive alignment plate.

An embodiment is shown in FIG. 4. As is illustrated, an alignment plate 400 according to an embodiment of the invention may comprise a substantially flat plate 402 fabricated from a durable and dimensionally stable material. Examples may include, but are not limited to, metals such as aluminum, steel, brass, alloys alone or in combination, or plastic materials. The alignment plate 400 may be removed and reused for various installations or may be discarded upon installation of a single transmission to a bellhousing and engine. As shown, a circular opening 404 may be formed in the plate 402. Additionally, two or more locating holes 406 may be formed in the plate. These locating holes 406 may correspond to locating holes 206 (see FIG. 2) formed in a bellhousing 202. Additionally, one or more mounting holes 408 may be formed in the plate 402. These may serve to secure the plate to a bellhousing during an alignment process by receiving alignment dowels.

It should be understood that the alignment plate 400 is not a transmission plate. One problem with prior art installation method is that a transmission plate may need to be removed to align a bellhousing with an engine appropriately. However, it is desirable to provide a method with does not require removal of such transmission plate in order to perform or ensure the alignment. Removal of the transmission plate can result in other problems such as loss of parts, improper assembly, tolerance problems, and the like with the transmission.

Figure 8:
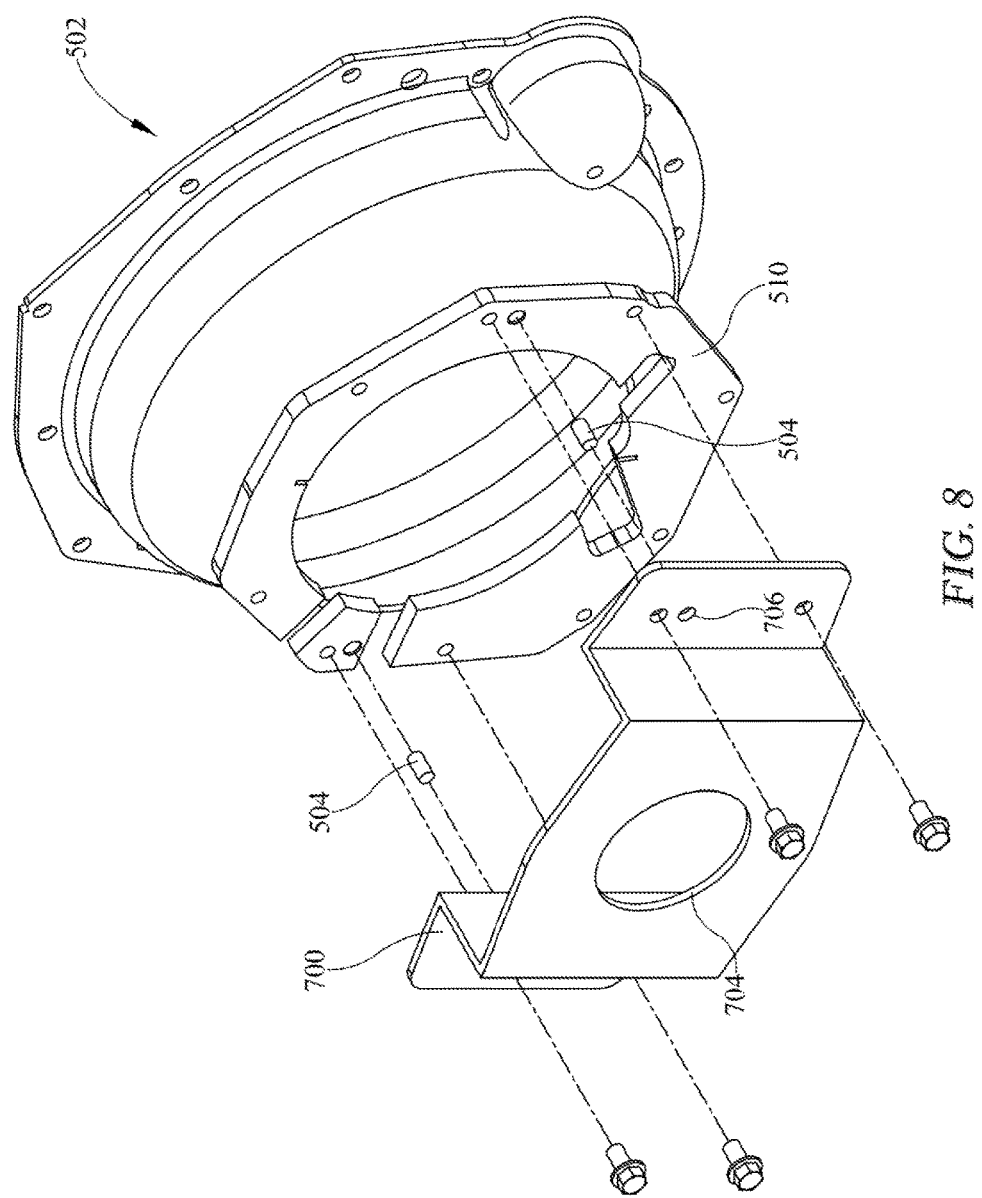

Further, the alignment plate need not be entirely planar. For example, as shown in FIG. 8, the alignment plate 700 may have some offset from entirely flat or planar plate and still be within the scope of the present claims. The alignment plate 700 may include planar portions for the locating holes 706 and the shaft opening 704 which are offset. The offset may be helpful depending on shaft 104 length. The bellhousing 502 comprises the locating holes 508 which have a dimensional relationship to the center of the shaft 104 which will pass therethrough. Likewise, when the alignment plate 400, 700 is placed on the bellhousing 502, the locating holes 406, 706 can be utilized to determine the relationship of the bellhousing 502 relative to the center of the shaft 104. Accordingly, by aligning the plate 400 and the aperture 404 relative to the known relationship of the engine locating holes 508, the known position of the shaft 104 may be determined relative to the bellhousing 502. As a result, the bellhousing 502 may be adjusted relative to the shaft 104 based on the locating holes 508 and the locating holes 406 so that the transmission may subsequently be connected and maintain proper alignment of the driveline.

Further, it should be understood that the relationship between the locating holes 406, 706 and the opening 404, 704 may differ for different transmissions. Therefore, plates 400, 700 may be made for different transmissions specifically or may be formed with different locating hole positions to accommodate different transmissions.

Figure 5:
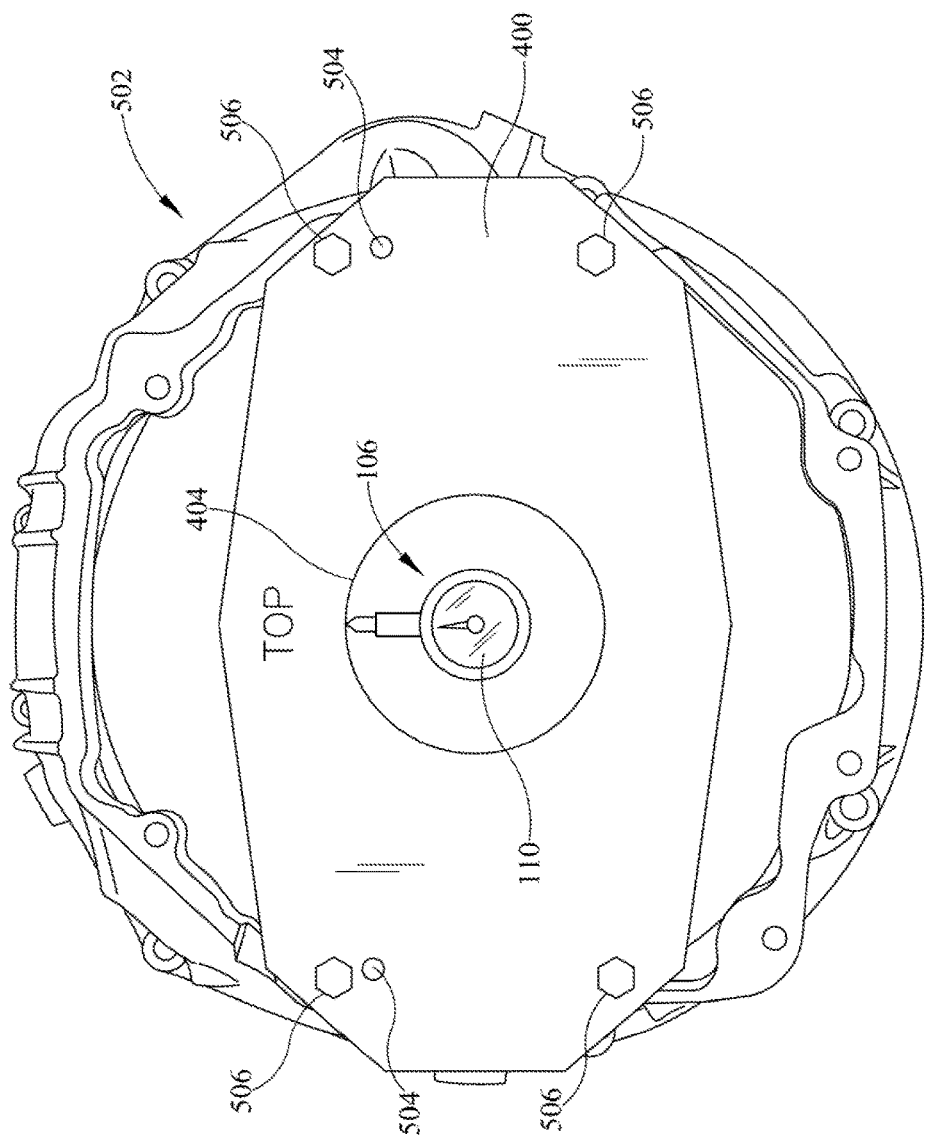
FIG. 5 is an illustration of an alignment plate mounted to a bellhousing in anticipation of an alignment procedure.

Additionally, as depicted by comparing FIGS. 4 and 5, the alignment plate 400 is not limited to the depicted shapes. For example, in FIG. 5, the corners are removed to alter the shape in some embodiments. However, other shapes may also be utilized for example rectangular with to without corners, for non-limiting example. Also, other shapes may be used which incorporate the shaft alignment opening 404 and the locating holes 406, as well as one of more apertures or other mechanisms for connecting the alignment plate to the bellhousing 502.

Figure 6:
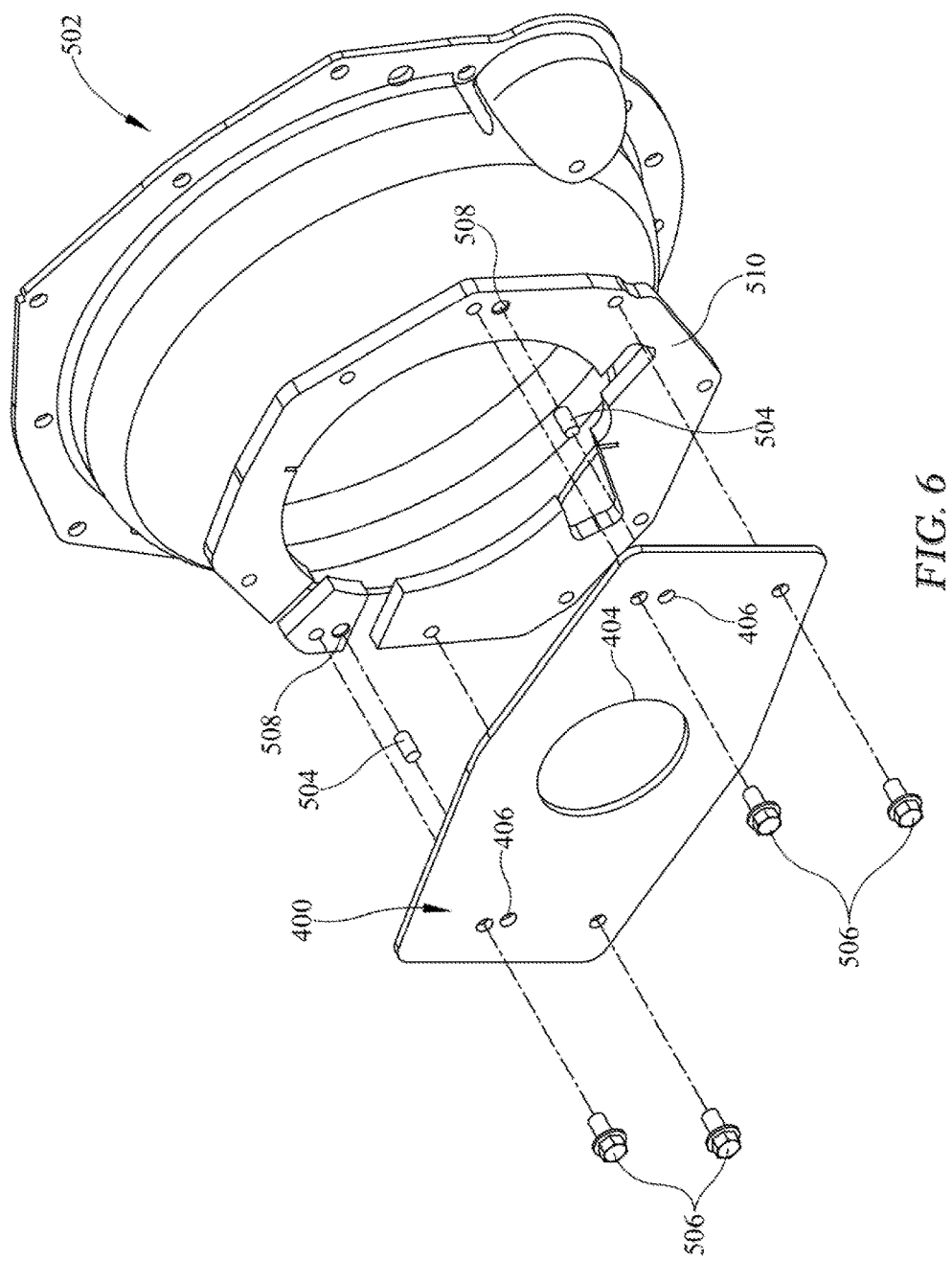
FIG. 6 is an exploded perspective view of an illustrative bellhousing and an alignment plate.

As is illustrated in FIGS. 5 and 6, when in use, the alignment plate 400 may be affixed to a bellhousing 502. The bellhousing 502 may be like the bellhousing 202 in that known methods of installing a transmission require use of a transmission plate, for any of the reasons of irregular shaped opening, non-circular, non-concentric opening, large opening size or combinations thereof such that there is difficulty in using an alignment tool therewith. Additionally, while the embodiment of FIG. 5 is shown with one end configuration, a second embodiment of FIG. 6 includes an alternate end having a connecting ring or adapter 510. The alignment holes (not shown) of the bellhousing 502 may each be provided with a dowel 504 upon which the alignment plate locating holes 406 are positioned. These locating holes serve to position the alignment plate 400 correctly with regard to the bellhousing 502 such that the circular opening 404 corresponds to the not yet mounted transmission input shaft axis of rotation. Once the alignment plate 400 is positioned on the dowels, bolts 506 may be threaded into the various transmission mounting holes 408 of the bellhousing to secure the alignment plate 400 during the alignment process.

In addition, and with reference to FIG. 6, it is within the scope of the present embodiments that the alignment plate 400 when mounted to the bellhousing 502 may also be connected to a ring or adapter 510. In other words the connection of the alignment plate 400 to the bellhousing 502 may be both direct or indirect. In the present embodiment, the ring 510 may be connected to the bellhousing 502 and when this occurs, the alignment plate 400 is connected to ring 510.

Figure 7:
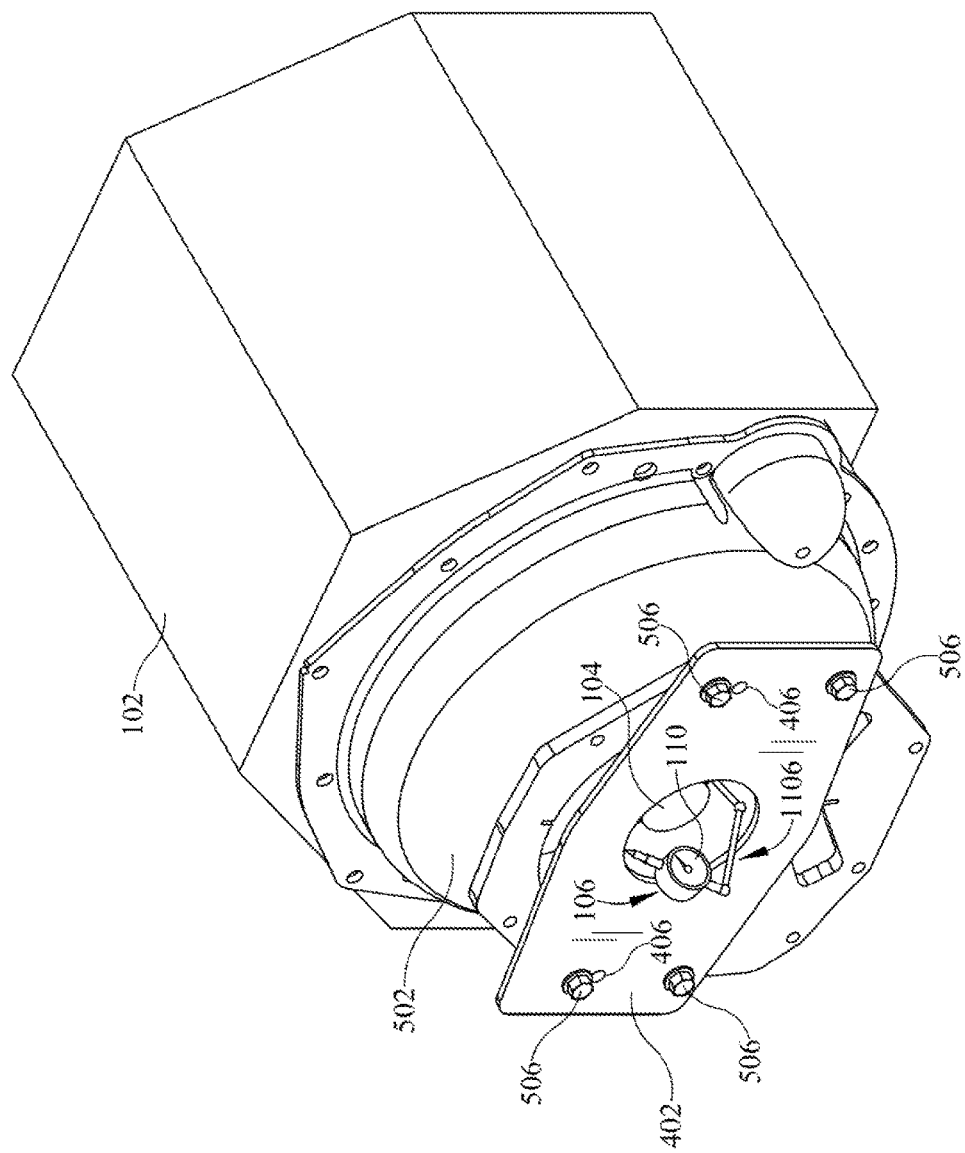
FIG. 7 is an alternate embodiment including a bracket structure for mounting an alignment tool, such as an alignment indicator; and, FIG. 8 is an alternate embodiment of an alignment plate.

An alignment tool 106 may then be installed onto the crankshaft of the engine (not shown). In some embodiments, the alignment tool 106 may be a dial indicator which is in some embodiments connected to the shaft 104 or may be alternatively connected to the plate 400. In some embodiments, the alignment tool 106 may be connected directly to the shaft as shown in FIG. 5, or may be indirectly connected as shown in Figure, for example, where a bracket 1106 may be connected to the shaft 104 and the alignment tool 106 is connected to the bracket 1106. The dial indicator 110 may for example have a plunger which extends from the shaft 104 to the peripheral edge of the opening 404. The nearer or further the plunger moves from the edge of the opening 404, the more the change on the dial indicator through the rotation of the shaft 104. Once installed, the crankshaft 104 (FIG. 7) may be rotated to enable a user to make adjustments to the bellhousing mounting such that the opening 404 of the alignment plate 400 is substantially centered on, or relative to, the axis of rotation of the engine crankshaft 104. As the shaft 104 is rotated with the tool 106 thereon, the tool 106 engages the shaft opening 404 and gives measurements along the perimeter of the opening 404. These measurements provide a relationship of the various locations of the opening relative to the center of the shaft 104. Due to the relationship of the locating holes 406 on the alignment plate 400 and the locating holes 206 on the bellhousing relative to the shaft 104, a measurement is provided of the opening 404 position relative to the shaft. Once the relationship is determined between the locating holes 406 and the shaft 104, the relationship between the locating holes 406 (and a transmission) and the opening 404 will be known as well. Stated yet another way, the locating holes 406 have relationship to center of shaft 104 and the plate opening 404 provides a hole concentric to shaft 104. The opening 404 also has a relationship to locating holes 406 thus by locating the plate opening 404, the relationship to the shaft 104 may be determined without having to mount the transmission or the transmission plate. With these measurements, a direction of adjustment of the bellhousing 202 may be determined and the bellhousing 202 may be adjusted relative to the engine block 102 in order to provide proper alignment of the driveline with critical tolerances. Such adjustment, if necessary, may be made for example by use of offset dowels which will shift the bellhousing into concentric alignment with the shaft 104. For example, the transmission input bearings and/or shaft may have a preselected tolerance within a specific range. In some non-limiting embodiments, for example, the tolerance may need to be within 0.005" (five (5) one-thousandths on an inch). By determining a dimensional relationship between the shaft 104 and the opening 404, a user may then determine the direction which the bellhousing 202 needs to move and the size of the offset dowels needed, if necessary, the center of the opening 404 may be adjusted relative to the shaft 104. For example, that the shaft 104 and opening 404 be within a preselected tolerance at multiple positions, such as for non-limiting example, at four positions related to 12 o'clock, 3 o'clock, 6 o'clock and 9 o'clock, or otherwise stated for positions ninety degrees apart. Other spacing intervals however may be utilized. Once the alignment plate 400 is positioned properly (by way of the alignment plate 400 adjustment relative thereto, if necessary with offset dowels, and properly aligned, is confirmed to be adjusted correctly, it may be removed. Next, a transmission may be mounted to the bellhousing 502 to complete the engine/bellhousing/transmission assembly. Since the dowels are still inserted in the bellhousing 502, the transmission will be positioned appropriately relative to the crank shaft 104.

Any of the present embodiments may include any of the features of the other embodiments. The exemplary embodiments herein disclosed are not intended to be exhaustive or to unnecessarily limit the scope of the claims. The exemplary embodiments were chosen and described in order to explain the principles so that others skilled in the art may practice the invention. Having shown and described exemplary embodiments, those skilled in the art will realize that many variations and modifications may be made. Many of those variations and modifications will provide the same result and fall within the spirit of the claims.

What is claimed is:

1. A method of aligning a bellhousing, comprising the steps of:
    positioning an alignment plate on a bellhousing having one of an irregular or non-centered opening;
    aligning at least two dowels with alignment holes on said alignment plate,
    fastening said alignment plate to said bellhousing;
    attaching an alignment tool either directly or indirectly to a shaft and engaging an edge of a shaft aperture in said alignment plate with said alignment tool.

2. The method of claim 1, further comprising rotating said shaft.

3. The method of claim 2, further comprising taking a measurement at multiple locations during said rotation from one of said shaft or said opening to the other of said shaft or said opening.

4. The method of claim 3, determining a dimensional relationship between axis of the shaft and said opening of said alignment plate.

5. The method of claim 4, removing said alignment plate from said bellhousing once said dimensional relationship is determined.

6. The method of claim 5 further comprising inserting offset dowel pins if said dimensional relationship is outside a preselected tolerance.

7. The method of claim 1, further comprising eliminating a need to remove a transmission cover for alignment.

8. The method of claim 1, said aligning reducing stress between said shaft and bearings of transmission.

9. The method of claim 1, further comprising removing said plate and attaching a transmission to said bellhousing.

10. A device for alignment of a bellhousing, comprising:
    an entirely planar alignment plate having a planar surface and at least one shaft aperture corresponding to a shaft location;
    a plurality of locating holes in said plate configured to receive dowels;
    a plurality of fastening holes in said plate configured to fasten said plate to a bellhousing having one of an irregular or non-centered opening.

11. The device of claim 10, said locating holes having a known dimensional relationship relative to said shaft aperture.

12. The device of claim 10 wherein said plate is connectable to a bellhousing having locating holes which align with said plurality of locating holes on said plate.

13. A system for aligning a bellhousing, comprising:
    the bellhousing having a first larger opening and a second smaller opening;
    said second opening having at least one of an irregular shape or a shape which will not work with an alignment tool;
    an alignment plate having a shaft aperture, a plurality of fastening apertures and a plurality of dowel apertures;
    wherein said shaft aperture is configured to be aligned with a drive shaft and allows for use of said alignment tool relative to said shaft aperture.

14. The system of claim 13, said alignment tool being connected to one of said shaft and said alignment plate and engaging one of said shaft and said shaft aperture.

15. The system of claim 13, said bellhousing further comprising a connecting ring.

16. The system of claim 13 said alignment plate being entirely planar.

* * * * *